United States Patent [19]

Leslie

[11] Patent Number: 5,269,997

[45] Date of Patent: Dec. 14, 1993

[54] METHOD AND APPARATUS FOR STAMPING PLASTIC ARTICLES SUCH AS SOAP BARS USING ELASTOMERIC SHEET SEPARATORS

[75] Inventor: Thomas F. Leslie, Edgewood, Ky.

[73] Assignee: The Procter & Gamble Company, Cincinnati, Ohio

[21] Appl. No.: 876,242

[22] Filed: Apr. 30, 1992

[51] Int. Cl.$^5$ .................................................. B29C 43/50
[52] U.S. Cl. ................................. 264/320; 264/316; 264/325; 264/334; 264/338; 249/112; 425/395; 425/812; 425/436 R
[58] Field of Search ............... 264/320, 132, 338, 334, 264/337, 293, 325, 163, 316; 425/385, 401, 394–395, 812, 436 R; 249/112

[56] References Cited

U.S. PATENT DOCUMENTS

| | | | |
|---|---|---|---|
| 1,853,978 | 4/1932 | Jergens | 249/112 |
| 1,958,184 | 5/1934 | Cross | 249/112 |
| 2,423,435 | 7/1947 | Block | 264/132 |
| 2,613,397 | 10/1952 | Borkland | 264/316 |
| 2,763,049 | 9/1956 | Peebles | 264/316 |
| 2,965,946 | 12/1960 | Sweet et al. | 264/325 |
| 3,041,989 | 7/1962 | Tanner et al. | 113/49 |
| 3,094,758 | 6/1963 | Downie et al. | 425/394 |
| 3,159,699 | 12/1964 | Sutphin | 264/320 |
| 3,241,208 | 3/1966 | Sweet et al. | 264/325 |
| 3,357,072 | 12/1967 | Sutphin | 25/7 |
| 3,365,764 | 1/1968 | Wall | 25/7 |
| 3,408,436 | 10/1968 | Cubitt | 264/225 |
| 3,446,900 | 5/1969 | Kamen | 264/132 |
| 3,449,804 | 6/1969 | Moses et al. | 25/7 |
| 4,793,959 | 12/1988 | Adams et al. | 264/320 |
| 4,809,945 | 3/1989 | Roussel | 249/136 |
| 4,822,273 | 4/1989 | Adams et al. | 425/385 |
| 4,917,589 | 4/1990 | Manderson | 425/318 |
| 4,970,044 | 11/1990 | Kim et al. | 264/266 |

FOREIGN PATENT DOCUMENTS 703342 12/1979 U.S.S.R. ................ 264/320

*Primary Examiner*—Jeffery Thurlow
*Attorney, Agent, or Firm*—Dean L. Garner; Kevin C. Johnson; E. Kelly Linman

[57] ABSTRACT

A method and apparatus for stamping a blank of plastic material, such as a soap blank, into a shaped article, such as a soap bar. The apparatus and method uses a pair of mating die halves spaced apart from one another in order to receive the blank of plastic material. Thereafter, the blank of plastic material is stamped and shaped by closing the die halves so they are mating. The die halves are then opened so as to discharge the shaped article and receive a new blank of plastic material. The present invention contemplates placing an elastomeric septum across each die half between the blank and the die half so as to prevent plastic material from sticking to the die halves after stamping. It has been found that a septum made from latex works well.

11 Claims, 5 Drawing Sheets

METHOD AND APPARATUS FOR STAMPING PLASTIC ARTICLES SUCH AS SOAP BARS USING ELASTOMERIC SHEET SEPARATORS

FIELD OF THE INVENTION

The present invention relates to a method and apparatus for stamping a plastic material between a pair of mating die halves so as to form a shaped article. The present invention has further relation to a method and apparatus for manufacturing soap bars.

BACKGROUND OF THE INVENTION

In the manufacture of plastic materials such as bar soaps, the soap is generally extruded from a nozzle to form a continuous soap plug. Thereafter the plug is cut into smaller pieces called soap billets, whereupon the billet is then stamped to form individual bars of soap. Typical methods of stamping the billets into individual bars of soap involve the use of soap stamping machines. Exemplary machines which have been readily available in the marketplace include: the 1984 "Type AT-A" manufactured by G. Mazzoni: S.P.A. Busto Arsizo—Italy; and the 1985 "USN O" manufactured by Binacchi & Co., Via Gromsci 21045, Gazzada Schianno (Varese) Italy. Such machines have a pair of dies with their peripheral surfaces or lands adapted to meet in substantial face-to-face contact thereby compressing the billet between the pair of dies to give the bar its desired shape and final appearance. The stamping of billets between the forming dies gives each bar a uniform shape and a smooth and glossy surface. It also typically imprints a design such as a logo or trademark onto an area of the surface of the bar.

With the development of milder synthetic based formulas for soap bars, soap billets have become stickier and tend to press poorly within the dies, resulting in the individual bars having a poor final appearance. The problem has been that the milder soap formula tends to stick to the die during stamping. The soap material that sticks to the die makes an imprint on the next billet that is stamped, resulting in subsequent soap bars having an unsightly appearance. Because of this, production lines must be shut down in order to frequently clean the dies. This is inefficient and increases manufacturing costs, which ultimately increases the price of the final product to the consumer. Various methods have been used in the past to circumvent the aforementioned problem but none of them have solved the problem satisfactorily.

One method used in the past to prevent soap from sticking to the dies was to chill the dies on the production line. Soap plugs are usually at an elevated temperature when entering the stamping apparatus so that the billet can be easily molded into the desired shape. The difference in temperatures between the chilled dies and the soap billets reduces the amount of material sticking to the die during the stamping process. However, because the dies are chilled, water tends to condense on the dies and eventually forms frost. Frost sticking to the die tends to form an unsightly imprint on the soap bars in the same way that soap material sticking to the die does. Furthermore, the cold die cools the soap billet which reduces its malleability and causes the soap to shape poorly within the dies.

Another method used in the past was to place die liquors on the dies. Substances such as Brine or Alcohol when placed on the dies tend to reduce the amount of material sticking to the die during the stamping process. However, this method has many drawbacks. Some of the liquors that are used tend to interfere with and change the soap's chemical formulation and adversely affect the perfumes that are present in the soaps. Furthermore, if the dies are made of brass, as is common, some of the die liquors tend to corrode the dies. Lastly, the use of die liquors is very messy when used on line and is expensive, ultimately resulting in an increase in the price of the final product.

It is therefore an object of the present invention to provide an improvement to a method and apparatus for stamping blanks of plastic material into shaped articles, wherein plastic material is substantially prevented from sticking to the dies.

It is another object of the present invention to apply such improvements to the manufacture of soap bars.

It is another object of the present invention to provide such an improvement that is inexpensive and can readily be adapted to accommodate existing soap stamping methods and apparatus.

The aforementioned and other objects of the invention will become more apparent hereinafter.

SUMMARY OF THE INVENTION

A common method for stamping a blank of plastic material into a shaped article involves placing the blank between a pair of mating die halves while they are spaced apart from each other. The die halves are then mated together, thereby stamping and shaping the blank of plastic material into a shaped article. The die halves are thereafter opened so as to discharge the shaped article and receive a new blank. In accordance with the present invention there is provided an improvement to the method comprising the step of inserting two elastomeric septums, one extending across each die half, between the blank and the die half, thereby substantially preventing the plastic material from adhering to the die halves.

A common apparatus for stamping a blank of plastic material into a shaped article comprises a pair of mating die halves each having a cavity bounded by a land. The apparatus has an open position where the die halves are separated from one another in order to receive the blank of plastic material or discharge the shaped article, and a closed position wherein the die halves are mating so as to stamp and shape the blank of plastic material. In accordance with another aspect of the present invention there is provided an improvement to the apparatus comprising two elastomeric septums one extending across the cavity of each die half adjacent to its land. The septums are adapted to prevent the plastic material from adhering to the die halves.

BRIEF DESCRIPTION OF THE DRAWINGS

While the specification concludes with claims particularly pointing out and distinctly claiming the subject invention, it is believed that the same will be better understood from the following description taken in conjunction with the accompanying drawings in which:

DETAILED DESCRIPTION OF THE INVENTION

Figure 1:
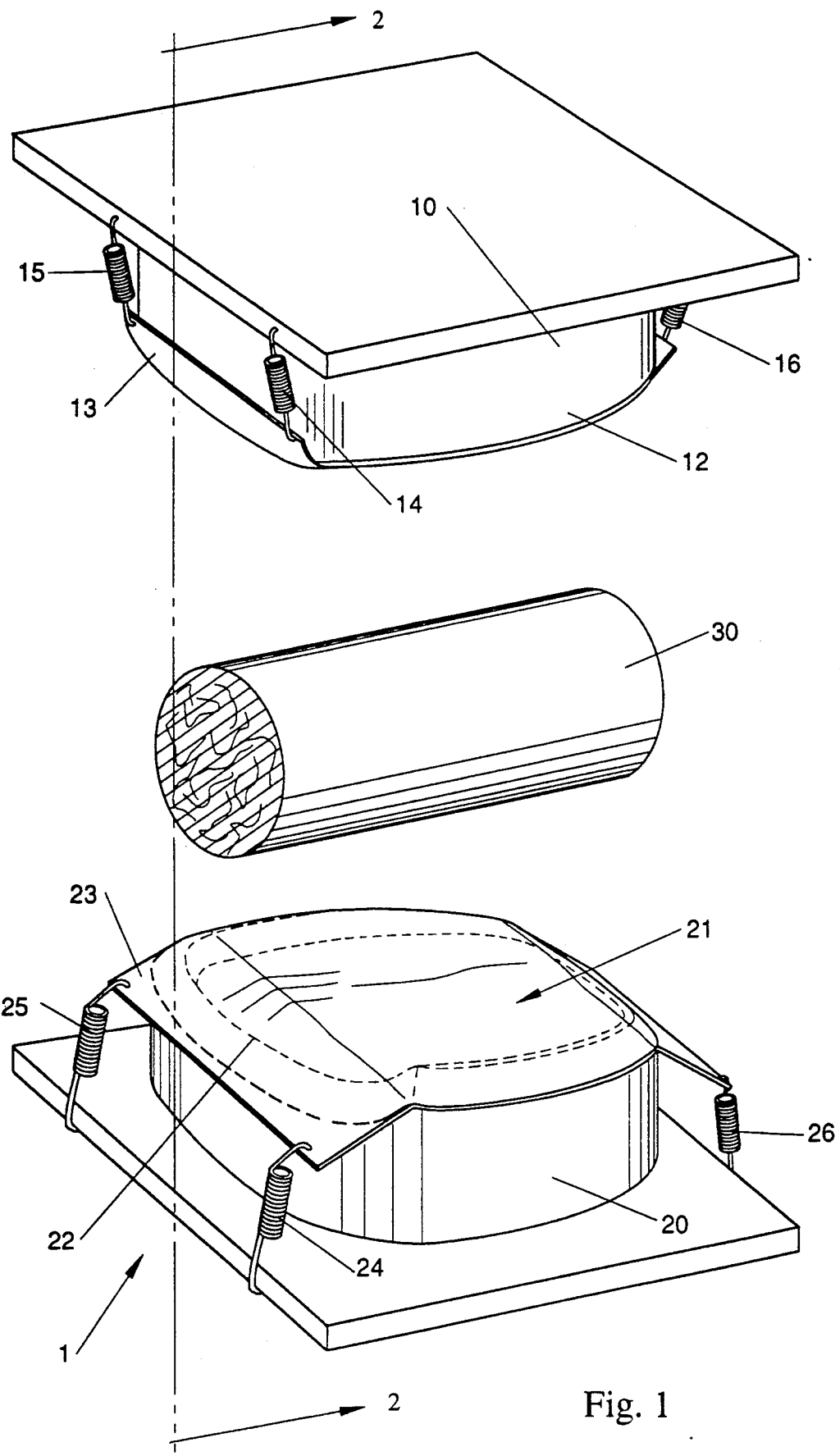
FIG. 1 is a simplified perspective view of a soap stamping apparatus having the improvement of the present invention, wherein the apparatus is in an open position with a soap billet between the dies.

Referring now to the drawings in detail wherein like numerals indicate the same element throughout the views there is shown in FIG. 1 a simplified view of an apparatus 1 for molding and shaping a plastic material, such as a soap billet, into a shaped article, such as a soap bar. The apparatus comprises top die half 10, having a cavity 11 (shown in FIG. 2) bounded by a peripheral surface or land 12, and bottom die half 20 having a cavity 21 bounded by a peripheral surface or land 22. To prevent plastic material 30 from contacting top die half 10, cavity 11 has an elastomeric septum 13 extending across it adjacent to land 12. Likewise, to prevent plastic material 30 from contacting bottom die half 20, cavity 21 has an elastomeric septum 23 extending across it adjacent to land 22. The elastomeric septums 13 and 23 constitute an improvement to the soap stamping apparatus in that they substantially prevent the plastic material from sticking to the apparatus.

Figure 2:
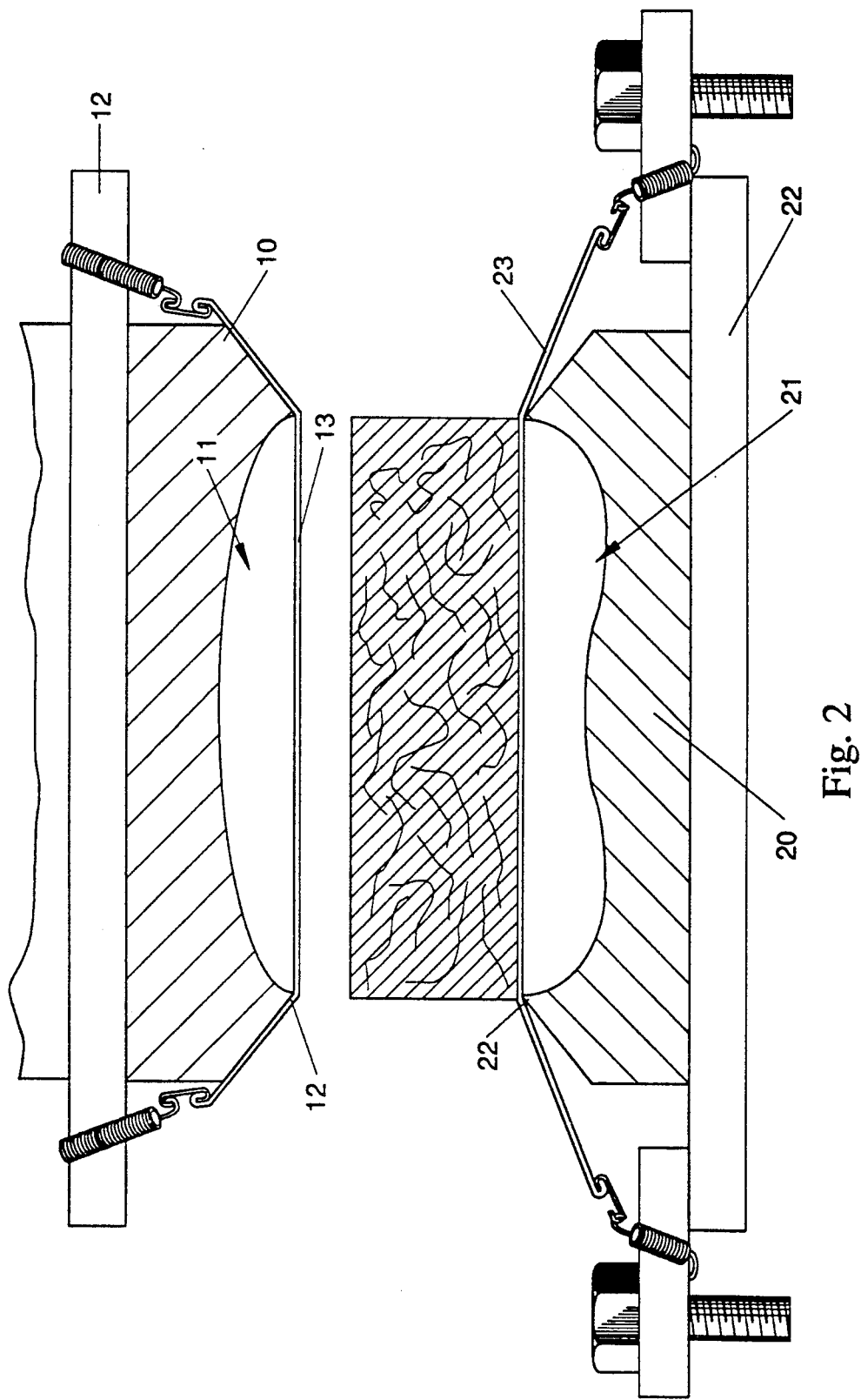
FIG. 2 is a sectional view of the dies of FIG. 1 taken along line 2—2 and with the soap billet adjacent the bottom die.
Figure 3:
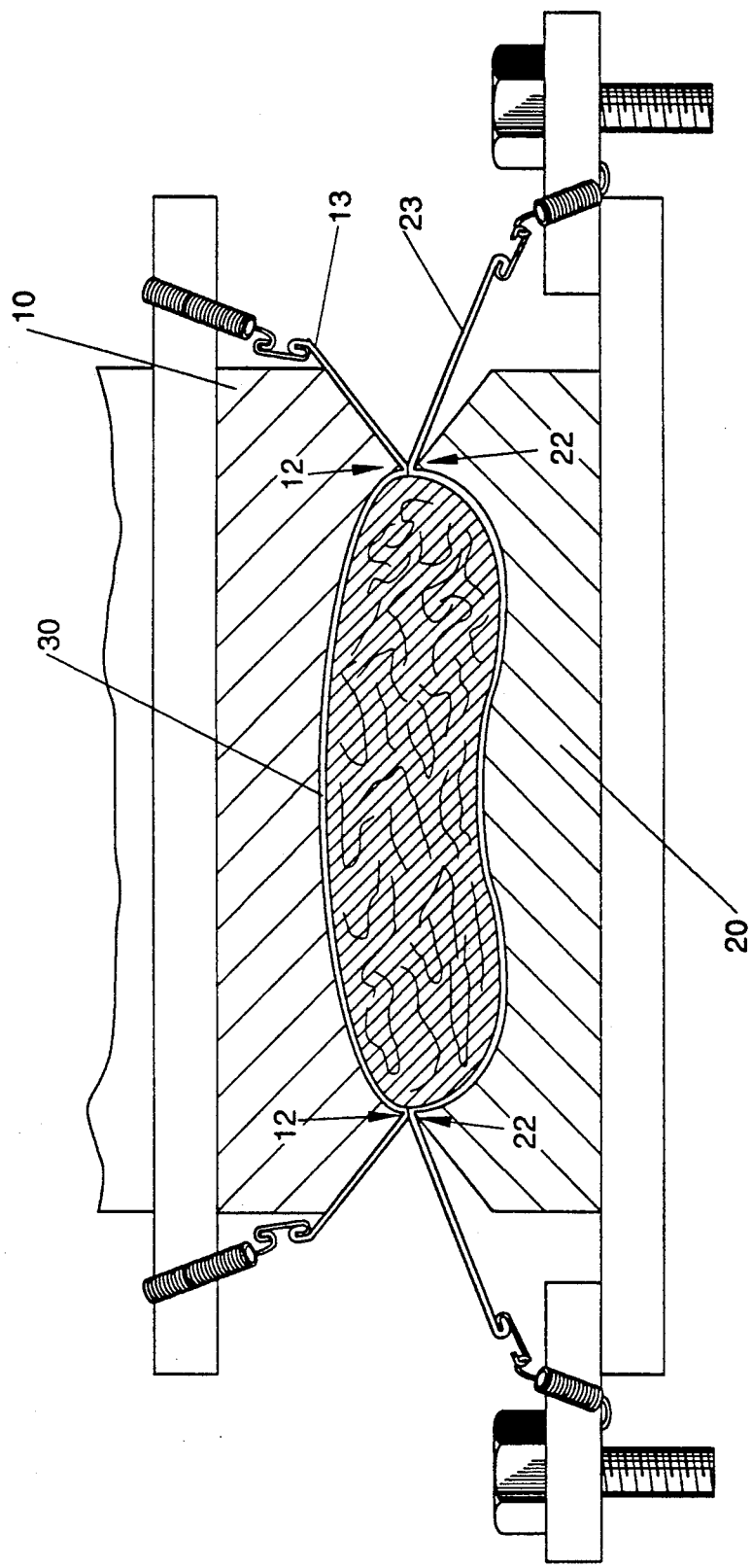
FIG. 3 is a sectional view of the apparatus of FIG. 1 in its closed position with the soap billet stamped between the dies.
Figure 4:
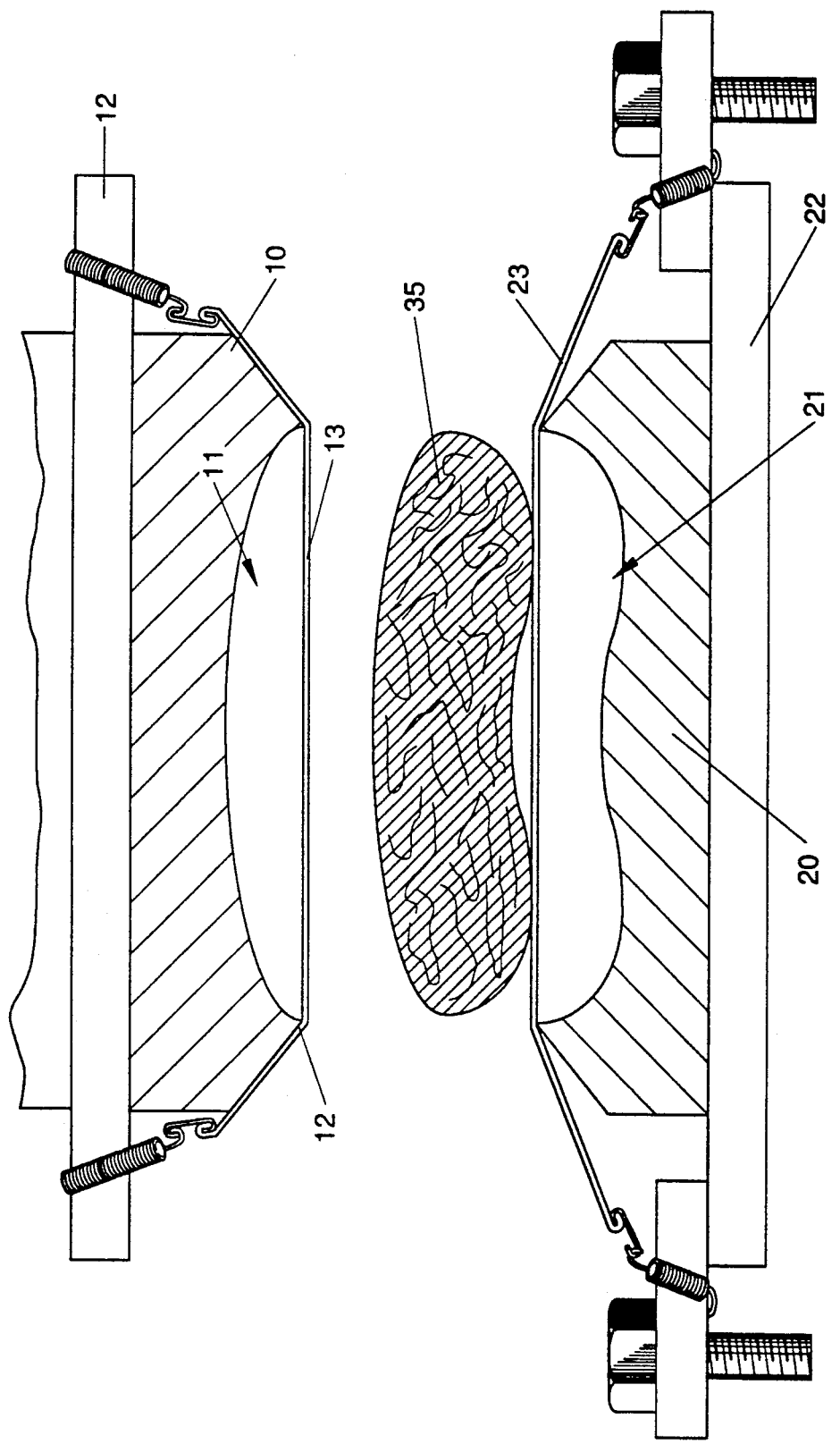
FIG. 4 is a sectional view of the apparatus of FIG. 1 in its open position so as to discharge the shaped article 35.

The apparatus has an open position for receiving a blank of plastic material or discharging a shaped article, and a closed position for stamping and shaping the blank of plastic material. FIGS. 1 and 2 show the apparatus in its open position so as to receive a blank of plastic material 30. FIG. 3 shows the apparatus in its closed position so as to stamp and shape the blank of plastic material 30. FIG. 4 shows the apparatus in its open position so as to discharge a shaped article 35. Because the apparatus is especially adapted to stamp soap billets, the blank of plastic material 30 is also referred to herein as a soap billet and the shaped article 35 as a soap bar.

The method of stamping a blank of plastic material, such as soap billet 30, into a shaped article according to the present invention can best be understood by referring to FIGS. 2-4. FIG. 2 is a cross section of the apparatus of FIG. 1 taken along line 2—2 and having soap billet 30 adjacent die half 10. FIG. 2 shows the apparatus in the open position with die halves 10 and 20 spaced apart from each other. The method begins by placing soap billet 30 between die halves 10 and 20. Various soap stamping machines have different methods of delivering the soap billet to the dies. The soap billet 30 is then stamped and shaped by closing the die halves 10 and 20 so that they are mating as shown in FIG. 3. The apparatus is then opened, as shown in FIG. 4, so that the shaped article 35 can be removed and a new soap billet can be placed between the dies. The excess soap or trim that is trimmed off and not used to form the the soap bar is usually recovered and recycled. Various soap stamping machines and production lines have various methods for recovering this trim.

The method of the present invention is an improvement over prior methods in that prior to the stamping of soap billet 30 elastomeric septum 13 is inserted across die half 10 between die half 10 and soap billet 30 and elastomeric septum 23 is inserted across die half 20 between die half 20 and soap billet 30. As seen from FIG. 3, when the die halves 10 and 20 are closed the elastic nature of septums 13 and 23 allow them to conform to the shape of the die. Septum 13 conforms to the shape of cavity 11 and septum 23 conforms to the shape of cavity 21. The elastomeric septums 13 and 23 allow the blank of plastic material 30 to conform to the shape of the mating die halves when they are in the closed position without directly touching the dies themselves. As seen from FIG. 4, when the die halves 10 and 20 are opened again because the septums 13 and 23 are elastomeric they return to their original shape and position shown in FIG. 2 helping to discharge the shaped article 35 from the die halves.

It has been found that the addition of elastomeric septums 13 and 23 to dies 10 and 20 substantially eliminate sticking of soap material to the apparatus and its dies. It has been found that elastomeric septums made of latex work well. One such latex material that has been shown to work well is highgrade EPDM (Ethylene Propylene Diene) 1/64 of an inch thick having a hardness of 40 durometer and an upper temperature limit of 225° F. purchased from Sur-Seal Gasket and Packing, Inc. Cincinnati, Ohio 45225. Latex materials of this type are commercially available in the marketplace. When the soap billet 30 is stamped between dies 10 and 20 as shown in FIG. 3 the latex material of septums 23 and 13 expands and stretches to take on the shape of the dies. As the apparatus opens the latex of septums 13 and 23 contracts to go back to its original position. As the septums 13 and 23 contract to their original position, it is believed that the latex pushes the soap material from its surface so that no soap material sticks to the septums and hence no soap material sticks to the dies. This expanding and contracting of the septums helps in preventing the plastic material from sticking to the die. Other elastomeric materials exhibiting the same characteristics could be used.

Figure 5:
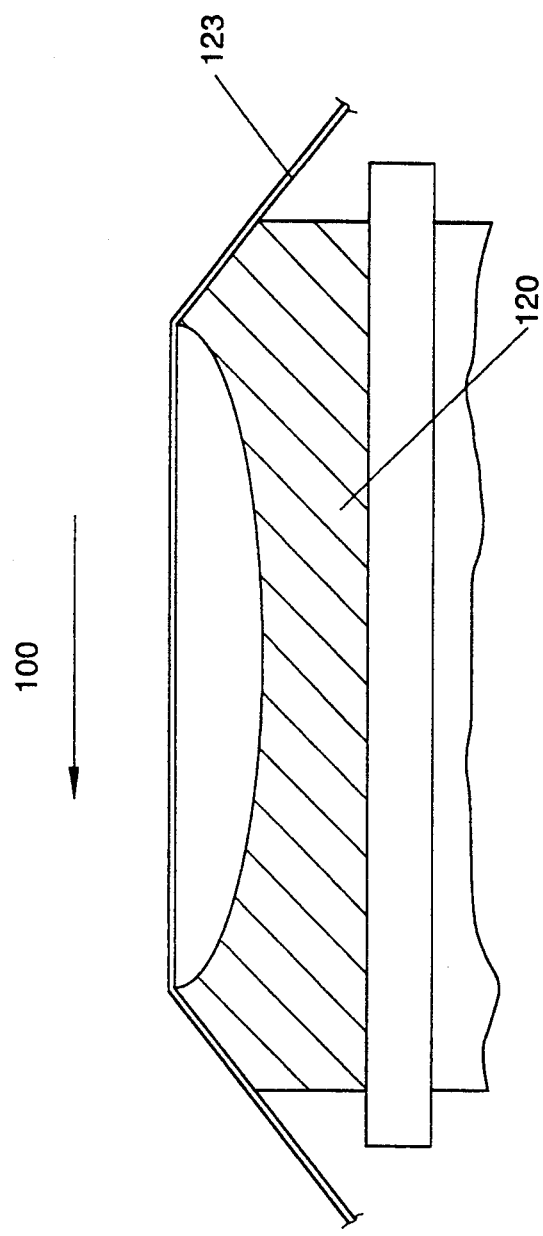
FIG. 5 is a simplified side view of an alternative embodiment of a die half of the present invention.

FIGS. 1-4 shows the septums 13 and 23 as being connected to dies 10 and 20 by springs 14, 15, 16, 17 (not shown), 24, 25, 26 and 27 (not shown). This has proven to be an easy and quick means to attach the septums to the dies. However this is not the only way septums 13 and 23 can be attached to dies 10 and 20. The septums themselves may be directly adhered to the dies without the springs. The elasticity of materials like latex allow the septums to expand and contract without the need for springs. In another embodiment shown in FIG. 5 the septum can be in the form of a moveable conveyor running across the die. FIG. 5 shows die half 120 having septum 123 running across it. Septum 123 is in the form of a conveyor and would include a means to move it in the direction of arrow 100. Therefore, the portion of septum 123 actually making contact with the die can be replaced from time to time to prevent its wearing out. The conveyor could be a closed loop, wherein the apparatus would include a brush or the like to sweep off the latex before returning to the dies.

Other methods of attaching the septums to the dies may be appropriate and may very well depend on the type of soap stamping machines and elastomeric material being used. What is required is that the one septum be placed between the soap billet 30 and each die 10 and 20 such that they can stretch and take on the shape of the cavities 11 and 21 when the apparatus is in its closed position and that the septums can contract to their original position when the apparatus is re-opened. Any method of attaching the septums 13 and 23 to the apparatus that allows for these conditions would be suitable.

In order to prevent the latex septums 13 and 23 from frequently being sheared off or otherwise cut by the dies it has been found that it is preferred to use the present invention with what is referred to as pillow shaped dies. An example of what a pillow shaped die is can best be described by referring to FIG. 3. Land 12 of die 10 makes head on head contact with land 22 of die 20. If the lands of the dies were such that their edges did not meet but one edge overlapped the other, as in box dies, the latex septums 13 and 23 might shear and tear more often under the force of the dies.

The use of the elastomeric septums 13 and 23 also facilitates in the discharge of the soap bar from the dies 10 and 20. After the soap billet 30 is stamped the septums 13 and 23 contract to their original position. This means that the septums will go from being in the position they are in FIG. 3 to their position in FIG. 1. The septum springs back to its original position discharging the soap bar as shown in FIG. 4. In some cases a vacuum may exist between the septums 13 and 23 and the dies 10 and 20 when the apparatus is in its closed position as shown in FIG. 3. This causes the septums 13 and 23 to stick to the dies 10 and 20. The effect of the vacuum can be eliminated by any suitable method. One way that this problem can be alleviated is by drilling holes in the dies that extend through the lands 12 and 22 into the cavities 11 and 21. This will equalize the pressure and allow the septums to contract into their original position and discharge the soap bar, as shown in FIG. 4.

While particular embodiments of the present invention have been illustrated and described, it will be obvious to those skilled in the art that various changes and modifications can be made without departing from the spirit and scope of the present invention, and it is intended to cover in the appended claims all such modifications that are within the scope of this invention.

What is claimed is:

1. In a method for stamping a blank of plastic material into a shaped article comprising the steps of placing a blank of plastic material between a pair of mating die halves while they are spaced apart from each other, stamping and shaping said blank of plastic material by closing the die halves so they are mating, and opening said die halves so as to discharge said shaped article and receive a new blank of plastic material, the improvement wherein said method further comprises the steps of inserting two elastomeric septums one substantially extending across each die half, prior to stamping said blank of plastic material between said die halves allowing said septums to expand with said blank during stamping, and automatically discharging said shaped article from said dies after stamping by allowing said septums to contract to their original shape.

2. The improvement of claim 1 wherein said elastomeric septums comprise latex.

3. The improvement of claim 1 wherein said blank of plastic material comprises a soap billet and said shaped article comprises a soap bar.

4. The improvement of any one of claims 1-3 wherein said method further comprises the step of relieving any vacuum between said septums and their adjacent die after said stamping of said blank.

5. In an apparatus for stamping a blank of plastic material into a shaped article wherein said apparatus comprises a pair of mating die halves each having a cavity bounded by a land, said apparatus having an open position wherein said dies are spaced apart from each other in order to receive said blank of plastic material or discharge said shaped article, and a closed position wherein said dies are mating so as to stamp and shape said blank of plastic material, the improvement wherein said apparatus further comprises two elastomeric septums one extending across the cavity of each die half adjacent its land, said elastomeric septums exhibiting the ability to expand with said blank during stamping, and to contract to their original position after stamping so as to discharge said shaped article from said dies.

6. The improvement of claim 5 wherein said elastomeric septums are formed from latex.

7. The improvement of claims 5 or 6 wherein said apparatus is a soap stamping machine designed to stamp a soap billet into a soap bar.

8. The improvement of claims 5 or 6 wherein said apparatus has a means for eliminating any vacuum created between said elastomeric septums and said dies.

9. The improvement of claim 8 wherein said means comprises one or more holes extending through each cavity into the ambient air.

10. The improvement of claims 5 or 6 wherein said mating die halves of said apparatus are pillow shaped dies.

11. The improvement of claims 5 or 6 wherein said septums are in the form of a movable conveyor running across said dies whereby the portions of said septums actually making contact with said dies can be replaced.

* * * * *